Aug. 25, 1942.　　J. J. BOLTON, JR., ET AL　　2,293,797
SHAFT POSITIONING DEVICE
Filed Dec. 27, 1941　　2 Sheets-Sheet 1

Inventors
James J. Bolton, Jr.
and Thomas Sykes
By Stevens and Davis
Attorneys

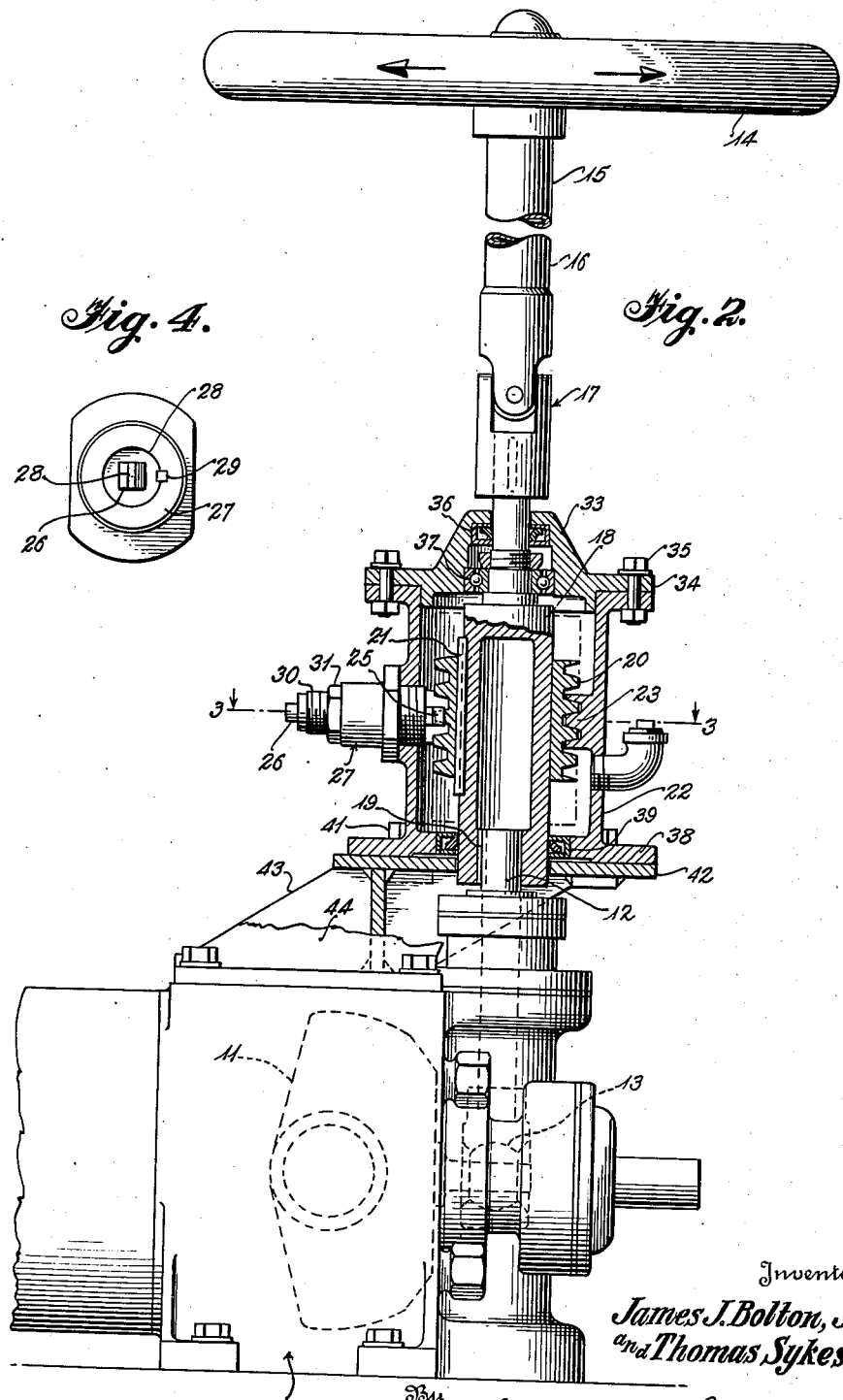

Patented Aug. 25, 1942

2,293,797

UNITED STATES PATENT OFFICE 2,293,797

SHAFT POSITIONING DEVICE

James J. Bolton, Jr., Merion, and Thomas Sykes, Philadelphia, Pa., assignors to C. H. Wheeler Manufacturing Company, Philadelphia, Pa., a corporation of Pennsylvania Application December 27, 1941, Serial No. 424,670

6 Claims. (Cl. 74—424.8)

This invention relates to control apparatus and is more particularly concerned with the disposition and maintenance of a control shaft in a predetermined angular position.

In many industrial situations it is necessary to make speed, pressure and/or direction adjustments in order to control the operating characteristics of a piece of apparatus. In some instances these adjustments are effected in a fully automatic manner while in other cases manual control may be superior for the intended purpose. It is to this latter type of control that the present invention is principally directed particularly where the control is effected through the angular displacement of an adjusting shaft which is actuated from an operating station remote from the controlled element.

Although the present invention is broadly applicable to all instances in which the problem which it solves is presented, it has been found to be of particular utility in connection with the control of the tilt box of the A-end of a hydraulic transmission of the Waterbury type.

Waterbury transmissions are, at present, widely used in conjunction with a number of power transmission problems particularly in cases where the prime mover and the driven part may not be directly aligned in such a way as to allow for the installation of a conventional gear type transmission assembly and where the smooth, even application of power is an important factor.

The delivery of a hydraulic transmission is controlled by rotation of a spindle which changes the angular disposition of a tilt box in the A-end. The direction of tilt of this tilt box controls the direction of rotation of the B- or driven-end of the transmission. Not only does the direction of tilt control the direction of movement of the B-end but the extent of tilt controls the piston displacement and hence the power delivery per stroke. In one position of the tilt box no delivery at all occurs and this is known as the neutral position. It will be realized that the adjustment of the tilt box of the A-end of the hydraulic transmission to neutral position and its maintenance in that position are exceedingly delicate operations, the very slightest variation from neutral position resulting in substantial undesirable creepage of the B-end.

In an effort to avoid creepage and to insure the accurate setting of the tilt box of a hydraulic transmission, it is now customary to provide a latch of some sort in association with the driving connection for the adjustment spindle of the transmission. This is usually located at the remote control station near, or in association with, the hand control. Such an arrangement, although more satisfactory than an arrangement in which no control is afforded, is subject to very serious disadvantages. These arise primarily because of the fact that there is generally a rather long connecting shaft between the control station and the adjusting spindle attached to the tilt box of the transmission. Such a connection is usually provided with one or more universal joints in such a way that it is mechanically impossible to avoid a certain amount of lost motion between the hand control and the A-end spindle. This lost motion will result in a few degrees variation between the angular position of the A-end spindle and the angular position of its control shaft so that, when the control shaft is set and latched in neutral position, the A-end may be in a short stroking position in either direction, depending upon the setting from which return to neutral was begun.

In addition to the foregoing difficulties it has been found that the known devices for apprising an operator of the angular disposition of a control shaft and for holding such shaft in that position are constructed in such a way as to involve inherently slight inaccuracies which are, of themselves, undesirable and when associated with a connection involving some lost motion, still further contribute to the operator's adjustment problems. These difficulties arise because of the fact that control shafts may be turned in either direction from a neutral position so that an adjustment from one extreme position to the other may involve several complete revolutions. It is therefore impossible to associate directly locking means with the shaft since the lock cycle would be repeated once every 360 degrees and thereby immobilize the shaft prior to the attainment of the desired adjustment. If a gear reduction system is used to overcome this problem there is inherently lost motion in the gear train so that regardless of the position of the locking means, either remote from or adjacent the direct control shaft, accurate disposition of that shaft in any exact angular position is not possible.

It is therefore an object of this invention to overcome all of the foregoing difficulties and to provide means for accurately positioning and holding a control shaft in any predetermined angular position.

It is contemplated, according to this invention, that a control shaft capable of angular displacement substantially in excess of 360 degrees, may be accurately set and held in any predetermined angular position in any of its cycles of rotation.

It is a further object of this invention to provide apparatus for setting and holding the shaft in predetermined angular position which is characterized by substantially complete absence of lost motion and which may be directly associated with a control spindle operated from a remote station through connections which may involve lost motion.

Other objects and advantages of this invention will be apparent upon consideration of the following detailed description of a preferred embodiment thereof in conjunction with the annexed drawings, wherein:

Figure 2 is a view in vertical section taken along the line 2—2 of Figure 1, including additionally the remote operating handwheel;

Figure 4 is a detail view of the shaft latching dog assembly associated with the control spindle of the hydraulic transmission.

Figure 1:
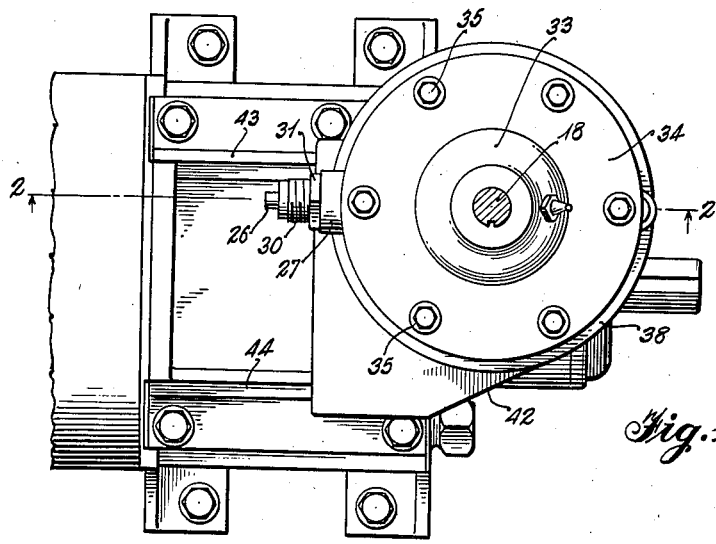
Figure 1 is a top plan view of the driving or A-end of a hydraulic transmission showing the present invention applied to the control spindle thereof.

Referring in greater detail to the drawings, 10 represents the A-end of a hydraulic transmission containing the usual tilt box 11, the position of which is adjusted by rotation of threaded spindle 12 in threaded universal 13. This arrangement is entirely conventional and is of the general type shown in Patent 1,020,285 to Reynold Janney.

The adjustment is effected from a remote handwheel 14 through shafts 15 and 16, universal joint 17 and shaft 18. It will be understood that shaft 16 may be a continuation of shaft 15 although the more customary practice involves the employment of a number of such shafts disposed between universal 17 and the operating station, adjacent shafts being connected by universal joints or otherwise as structural requirements of the installation may dictate. Because of the number of joints usually required there will be inherently considerable lost motion between the handwheel 14 at the operating station and shaft 18 although, because shaft 18 and spindle 12 are interfitted and keyed at 19, there will be no lost motion at that point. Thus, because of the hollow construction of the lower portion of shaft 18, said shaft and spindle 12 will turn as a unit and it is even possible to employ an integral construction. If the operator employs an indicator in association with handwheel 14, however, the exact angular position of spindle 12 and hence of tilt box 11 are not accurately readable thereon since such an indication will only serve to designate the position of shaft 15 and necessarily cannot compensate for the lost motion inherent in universal 17 and other joints interposed between shaft 15 and shaft 18. This inaccuracy is usually so slight as to be immaterial in adjusting the stroking of the A-end 10. On the other hand when the tilt box 11 is to be set to neutral, undesirable creepage of the driven B-end of the transmission can be avoided only by an adjustment of the most accurate nature.

To render such an adjustment possible and so that the operator may be apprised of the attainment of the desired adjustment, an exteriorly threaded sleeve 20 is keyed at 21 to shaft 18. Because of the provision of key 21, shaft 12 and sleeve 20 will rotate as a unit although the sleeve is free to move axially. It will be noted that a housing 22 surrounds that portion of shaft 18 to which sleeve 20 is keyed and this housing has projecting inwardly therefrom an arcuate threaded portion 23 which serves to maintain sleeve 20 against axial displacement. It can now be seen that upon rotation of shaft 18 through the various connections from handwheel 14, sleeve 20 will be likewise rotated and will creep axially of shaft 18 in a direction dependent upon the direction of rotation of said shaft and to an extent proportional to the extent of angular displacement thereof. It is clear that the extent of axial displacement of sleeve 20 per degree of angular displacement of shaft 18 is a function of the helix angle of the exterior threads of sleeve 20.

Figure 3:
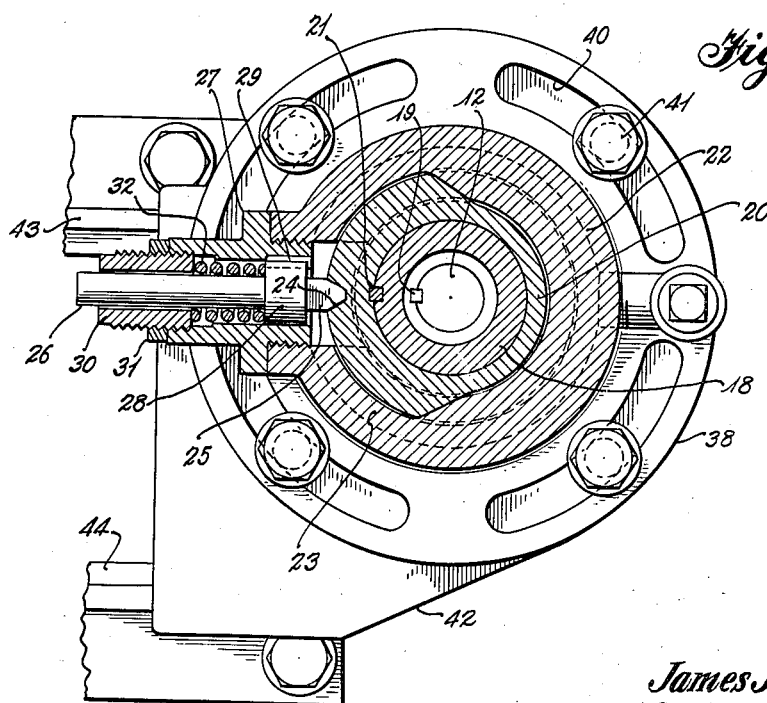
Figure 3 is a view in horizontal section taken along the line 3—3 of Figure 2.

It is desirable to provide an adjustment such that a full stroke position of tilt box 11 may be attained in either direction without displacement of threaded area 23 from the exterior threads of sleeve 20. The broken lines in Figure 2 serve to illustrate the extreme positions of sleeve 20 for full stroking of the hydraulic A-end 10 in either direction. Midway between these extremes the tilt box 11 reaches its neutral position. At that time threaded sleeve 20 will have one and only one axial position with respect to shaft 18 and consequently the threads will be always in the same position. To take advantage of this the thread of sleeve 20 is at its exact center provided with a wedge-shaped groove 24. This groove is adapted to cooperate with the wedge-shaped end 25 of a pin or dog 26 mounted in a tubular auxiliary housing 27 communicating with housing 22. Pin 26 is provided with an enlarged cylindrical portion 28 keyed at 29 to housing 27 as may be seen in Figures 3 and 4. An exteriorly threaded sleeve 30 is disposed in the interiorly threaded end of auxiliary housing 27 to act as a bearing for pin 26, said threaded sleeve being held in position by a lock nut 31. Between threaded sleeve 30 and the enlarged portion 28 of pin 26, a coil spring 32 is interposed, normally urging the wedge-shaped end 25 of pin 26 against the flat of the thread on the exterior of sleeve 20. Thus, as shaft 18 is turned and sleeve 20 turns with it and concurrently moves in an axial direction, the wedge-shaped end 25 of pin 26 will always rest on the flat of the thread until notch 28 comes into registry therewith. At that time the wedge-shaped end of pin 26 enters the wedge-shaped notch under the urging of spring 32. This will lock shaft 18, through sleeve 20, against further rotation and because of the wedge shape of the pin and notch will serve to very accurately position or center shaft 18.

The engagement of wedge-shaped projection 25 with notch 23 in the thread of sleeve 20 will be evident at the control station by markedly increased resistance to rotation on the part of handwheel 14. The operator is therefore apprised when the A-end tilt box 11 is in neutral position. When it is desired to unseat the wedge-shape pin from the notch, the operator needs only to exert a force sufficient to retract pin 26 by a camming action against the resistance of spring 32. While this can be easily done it can scarcely be accomplished without the knowledge of the operator.

The remaining structural details shown in the drawings are concerned with the bearing structures and support for the locking and centering device previously described. It will be noted that housing 22 is provided with a cap 33 having an annular flange 34 which is connected by bolts 35 to a similar flange extending from the upper portion of housing 22. Within cap 33 an oil seal 36 is located as well as a ball bearing assembly 37.

A flange 38 is provided at the bottom of housing 22 extending both inwardly and outwardly from the vertical housing wall. The inwardly extending portion of flange 38 defines a round aperture through which shaft 18 is passed, an oil seal 39 bearing against shaft 18 so that the lubricant for the threads of sleeve 20 and threaded portion 23 may be retained within housing 22. The outwardly extending portion of flange 38 is provided with four arcuate slots 40 through which bolts 41 are passed in order to connect said flange to a plate 42. As can be seen in Figures 1 and 2, plate 42 is bolted to the top of the transmission housing through standards 43 and 44.

It will be recognized that arcuate slots 40 are advantageous in the assembly of the device shown since the initial angular disposition of auxiliary housing 27 may be thereby varied. Although this invention has been described in conjunction with the spindle for adjusting the tilt box in the A-end of a hydraulic transmission it it evident that the structure shown is applicable to the centering of any shaft in any desired angular position.

We claim:

1. In a hydraulic transmission including a tilt box for controlling displacement and a revolvable shaft for controlling the angular disposition thereof, a sleeve keyed to said shaft but axially movable therealong, said sleeve including a helically screw-threaded exterior surface, means responsive to angular displacement of said shaft for axially moving said sleeve to a proportional extent, and a dog normally resiliently urged into engagement with the thread of said sleeve, the threaded area of said sleeve having a notch therein for the reception of said dog to lock said sleeve and the shaft to which it is keyed against rotative movement in one position of the adjustment.

2. In a hydraulic transmission including a tilt box for controlling displacement and a revolvable shaft for controlling the angular disposition thereof, a sleeve keyed to said shaft but axially movable therealong, said sleeve including a helically screw-threaded exterior surface, stationary means including a threaded area cooperating with the threaded area of the sleeve, and a dog normally resiliently urged into engagement with the thread of said sleeve, the threaded area of said sleeve having a notch therein for the reception of said dog to lock said sleeve and the shaft to which it is keyed against rotative movement in one position of the adjustment.

3. In a construction as claimed in claim 2, means for holding said dog for movement limited to reciprocation along its long axis whereby the dog may be unseated from the notch in the sleeve by application of slightly excessive rotative force thereto through said spindle.

4. In a construction as claimed in claim 2 in which said dog and said notch are wedge-shaped whereby to afford accurate positioning of the said sleeve as well as latching of the same in the desired angular position.

5. A device for accurately setting and holding a control shaft in a predetermined angular position comprising, an element to be controlled, a control shaft directly connected thereto, said control shaft being capable of movement in excess of 360°, means for turning said control shaft, a sleeve keyed to said control shaft but axially movable therealong, said sleeve including a helically screw-threaded exterior surface, means responsive to angular displacement of said shaft for axially moving said sleeve to a proportional extent, and a dog normally resiliently urged into engagement with the thread of said sleeve, the threaded area of said sleeve having a notch therein for the reception of said dog to lock said sleeve and the shaft to which it is keyed against rotative movement in one position of adjustment.

6. In a hydraulic transmission including a tilt box for controlling displacement, a shaft directly connected to said tilt box for adjusting the angular disposition thereof, said shaft being movable in excess of 360° to adjust the tilt box from one extreme position to the other, remote operating means for turning said shaft and means operatively connecting the remote operating means to said shaft, said connecting means involving at least some lost motion; means positively driven from said shaft axially thereof at a rate and to an extent proportional to the rate and extent of angular displacement of said shaft, means for locking said axially movable means in at least one of its axial positions, said last-named means comprising a coacting complementary wedge and socket arrangement, and means for resiliently urging the wedge into the socket, whereby when the wedge and socket are in registry the axially movable means and the shaft through which it is directly driven are locked in accurately centered positions despite the lost motion between the remote operating means and the shaft.

JAMES J. BOLTON, Jr.
THOMAS SYKES.